United States Patent
Chefalas et al.

(10) Patent No.: US 7,506,241 B2
(45) Date of Patent: Mar. 17, 2009

(54) METHOD AND APPARATUS FOR A SELF HEALING AGENT

(75) Inventors: Thomas E. Chefalas, Somers, NY (US); Steven J. Mastrianni, Unionville, CT (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 10/687,273

(22) Filed: Oct. 16, 2003

(65) Prior Publication Data

US 2005/0086630 A1    Apr. 21, 2005

(51) Int. Cl.
*H03M 13/00* (2006.01)
(52) U.S. Cl. .................... 714/819; 714/37; 714/38; 714/799
(58) Field of Classification Search ............... 717/100; 714/37, 38, 48, 774, 799, 819
See application file for complete search history.

(56) References Cited

U.S. PATENT DOCUMENTS

| | | | | |
|---|---|---|---|---|
| 4,956,807 | A * | 9/1990 | Hosaka et al. ............... 714/55 |
| 5,339,261 | A * | 8/1994 | Adelson et al. .............. 714/47 |
| 5,628,017 | A * | 5/1997 | Kimmerly et al. .......... 717/127 |
| 5,634,114 | A | 5/1997 | Shipley |
| 5,666,368 | A * | 9/1997 | Proulx ........................ 714/738 |
| 5,677,997 | A * | 10/1997 | Talatik ........................ 706/45 |
| 5,832,467 | A * | 11/1998 | Wavish ........................ 706/13 |
| 5,892,953 | A | 4/1999 | Bhagria et al. |
| 5,907,709 | A * | 5/1999 | Cantey et al. ............... 717/141 |
| 5,960,204 | A | 9/1999 | Yinger et al. |
| 5,999,942 | A * | 12/1999 | Talati ....................... 707/104.1 |
| 6,049,671 | A | 4/2000 | Slivka et al. |
| 6,125,390 | A * | 9/2000 | Touboul .................... 709/223 |
| 6,305,010 | B2 * | 10/2001 | Agarwal ..................... 717/126 |
| 6,425,126 | B1 | 7/2002 | Branson et al. |
| 6,490,255 | B1 * | 12/2002 | Kiriha et al. ................ 370/254 |
| 6,501,995 | B1 | 12/2002 | Kinney et al. |
| 6,718,286 | B2 * | 4/2004 | Rivin et al. ................. 702/186 |
| 6,718,546 | B1 | 4/2004 | Johnson |
| 6,789,255 | B1 | 9/2004 | Pedrizetti et al. |

(Continued)

FOREIGN PATENT DOCUMENTS

JP    05298204 A   * 11/1993

(Continued)

OTHER PUBLICATIONS

Chefalas et al., Distributed Autonomic Solutions Repository, Oct. 16, 2003.

(Continued)

*Primary Examiner*—Rachna S Desai
*Assistant Examiner*—Gregory A Distefano
(74) *Attorney, Agent, or Firm*—Yee & Associates, P.C.; Lisa Yamonaco

(57) ABSTRACT

A method, apparatus, and computer instructions for managing a program. Operation of the program is monitored by an agent process. An observed operation of the program is compared with an expected operation of the program to form a comparison. A determination is made as to whether an error has occurred based on the comparison. In response to an occurrence of the error, a solution for the error is obtained and implemented by the agent process.

24 Claims, 3 Drawing Sheets

U.S. PATENT DOCUMENTS

| | | | |
|---|---|---|---|
| 6,948,164 B2 | 9/2005 | Tinker | |
| 6,968,550 B2 | 11/2005 | Branson et al. | |
| 6,986,134 B1 | 1/2006 | Fosteer | |
| 6,990,660 B2 | 1/2006 | Moshir et al. | |
| 7,016,809 B1 * | 3/2006 | Gotwals et al. | 702/185 |
| 7,055,146 B1 | 5/2006 | Durr et al. | |
| 7,073,172 B2 | 7/2006 | Chamberlain | |
| 7,107,488 B2 * | 9/2006 | Hashimoto et al. | 714/25 |
| 7,162,714 B2 * | 1/2007 | Wenisch | 717/127 |

FOREIGN PATENT DOCUMENTS

JP 09171460 A * 6/1997
SU 1737455 A2 * 5/1992

OTHER PUBLICATIONS

Lewis et al., "Deploying distributed Business Software", SIGS Books, 1996, pp. 72-81.

"Problem Tracking Task Reference", Continuus Software Corporation, Change Management for Software Development, 1996, p. 1-217.

McAfee Oil Change User's Guide, May 1999, pp. 1-23.

"Consider Shifting from Automatic to Manual in Updating Programs", Houston Chronicle, Aug. 28, 1998, pp. 1-2.

"New Version of CyberMedia Oil Change Updates Your PC Automatically—Even While You Sleep", PR Newswire, Jun. 17, 1997, pp. 1-3.

Horton, "Beginning Visual C++ 5", Mar. 19, 1997, pp. 715-734.

* cited by examiner

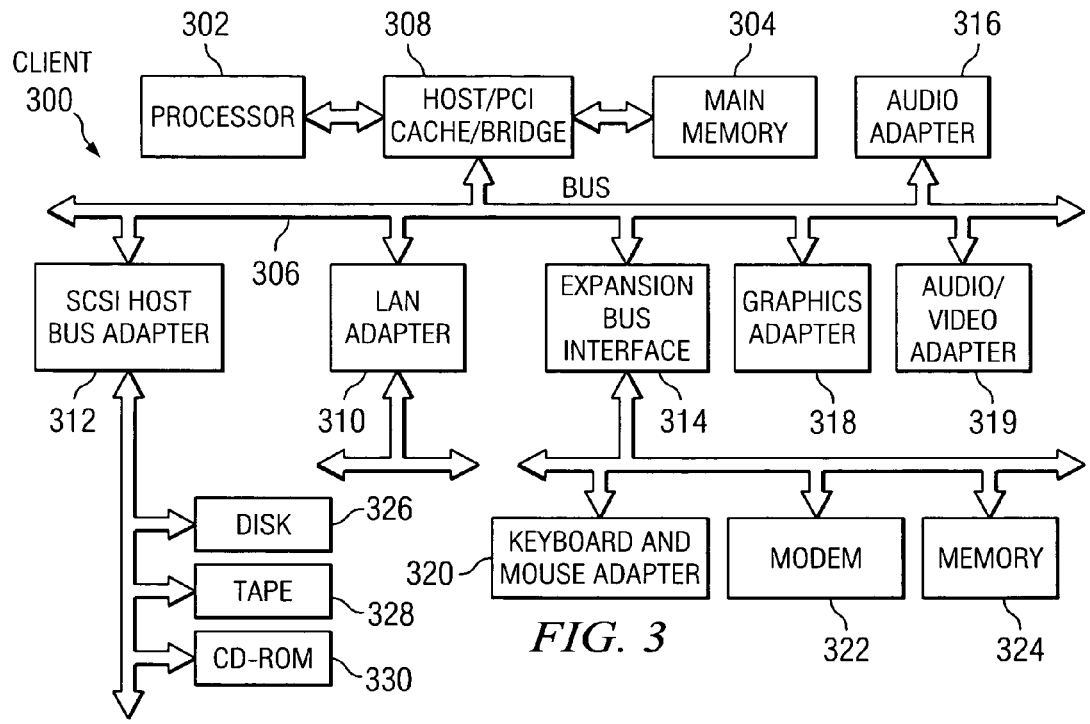
FIG. 3
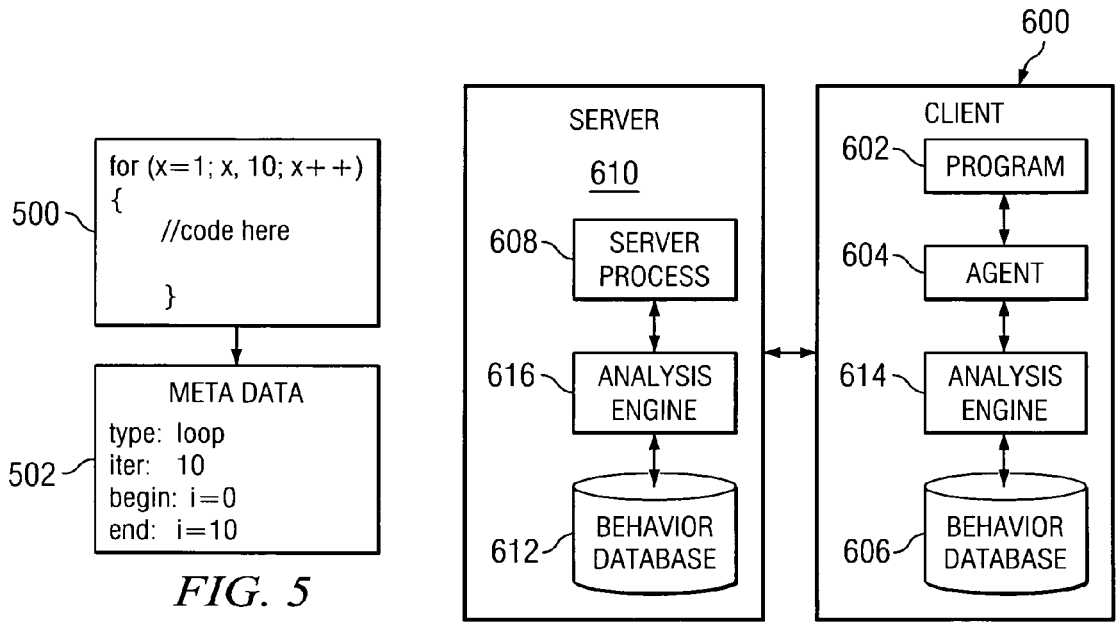
FIG. 5
FIG. 6

METHOD AND APPARATUS FOR A SELF HEALING AGENT

CROSS REFERENCE TO RELATED APPLICATIONS

The present invention is related to an application entitled Distributed Autonomic Solutions Repository, Ser. No. 10/687,176, filed even date hereof, assigned to the same assignee, and incorporated herein by reference in entirety for all purposes.

BACKGROUND OF THE INVENTION

1. Technical Field

The present invention relates generally to an improved data processing system and in particular to a method and apparatus for managing applications. Still more particularly, the present invention relates to a method, apparatus, and computer instructions for managing failures in applications.

2. Description of Related Art

The explosion of information and integration of technology into every day life has increased demands on how computer systems are managed and maintained. As access to information becomes omnipresent and expected through computers, handheld computers, and wireless devices, the stability of programs and data becomes increasingly important. With these advances, autonomic computing has been introduced in which software is implemented to aid in the management and maintenance of computer systems. One of the main features of autonomic computing is to provide self-fixing and self-healing components.

Currently, autonomic processes may be used to handle failures on computer systems. These autonomic processes also are referred to as agents. For example, if a program on a computer system fails to execute or hangs, the program may be restarted by an autonomic agent. In some cases, the entire computer system may be restarted or rebooted by this agent. Currently, in addition to restarting the application or data processing system, the autonomic agent also may send a notification to a human user. The human user may then select the appropriate diagnostic tools, analyze the problem, and implement a solution to the failure. The human user is typically a technician or engineer. To fix the problem, the user may have to download a program patch or perhaps modify the configuration of the system or pending program. If the program is at fault, new components, such as executables, libraries, or configuration files, are then installed by the user to fix the software problem.

Further, registry settings may have to be changed or certain program parameters may need to be adjusted. These settings are performed at the local machine on which the problem occurs. In some cases, the problem is with the autonomic software itself and the error is caused by a defective program. Currently, autonomic software is unable to fix itself.

Therefore, it would be advantageous to have an improved method, apparatus, and computer instructions for an improved autonomic agent that provides for self healing of software.

SUMMARY OF THE INVENTION

The present invention provides a method, apparatus, and computer instructions for managing a program for the purpose of providing self-healing operation of the program. Operation of the program is monitored by an agent process. An observed operation of the program is compared with an expected operation of the program to form a comparison. A determination is made as to whether an error has occurred based on the comparison. In response to an occurrence of the error, a solution for the error is obtained if available and implemented by the agent process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 5 is a diagram illustrating the generation of meta data for a profile in accordance with a preferred embodiment of the present invention;

FIG. 6 is a diagram illustrating components used for monitoring and repairing programs in accordance with a preferred embodiment of the present invention;

DETAILED DESCRIPTION OF THE PREFERRED EMBODIMENT

Figure 1:
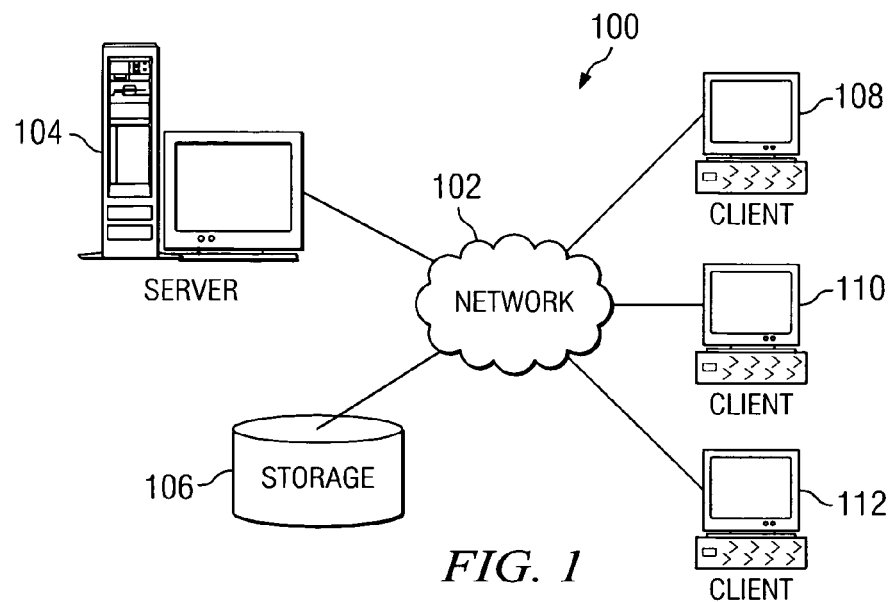
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
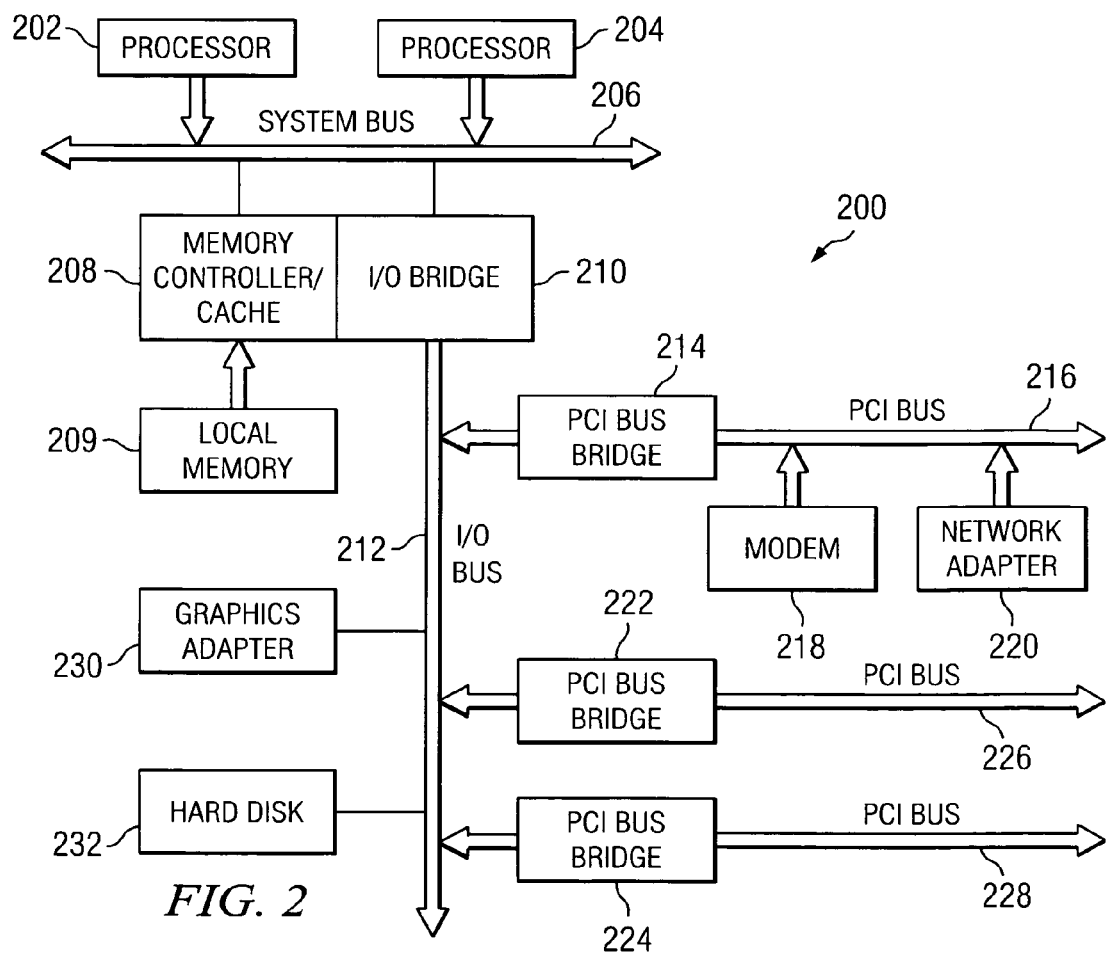
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to P/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for managing and repairing software on a data processing system. In particular, the mechanism of the present invention provides a self healing autonomic agent system. When a program or application is developed, the source code for the program is entered, edited, then compiled and linked to form an application executable. One part of the present invention adds an extra step in the file compilation and link process, the creation of a profile for each of the recognized program constructs. Another component of the present invention includes an agent used to monitor operations performed by an application and keeping a database of these operations and the normal or expected operating behavior.

Figure 4:
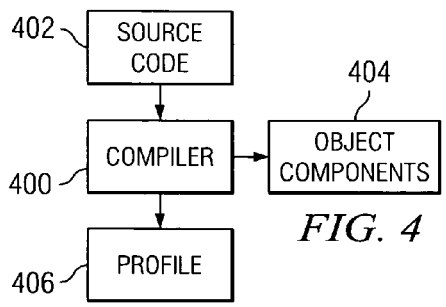
FIG. 4 is a diagram illustrating components used in creating a profile for components in a program in accordance with a preferred embodiment of the present invention.

Turning now to FIG. 4, a diagram illustrating components used in creating a profile for constructs in a program is depicted in accordance with a preferred embodiment of the present invention. In this example, compiler 400 receives source code 402 and generates object components 404. These object components may be linked during the linking process to form the program. Additionally, compiler 400 also generates a profile of the behavior of each of the program constructs. In these examples, a construct in this context is a specific group of computer instructions that are executed to provide a known behavior. For example, this behavior may be looping through an array, or examining data in a print buffer. The information regarding this behavior is stored in profile 406 in these examples. Profile 406 is later stored in a behavior database 612 or behavior database 606 in FIG. 6 below. The data in behavior database 612 is later used by profiling agent 604 to monitor the execution of software program 602.

With reference next to FIG. 5, a diagram illustrating the generation of metadata for a profile is depicted in accordance with a preferred embodiment of the present invention. In this simple example, component 500 is a loop construct. Metadata 502 is generated by a compiler, such as compiler 400 in FIG. 4, and stored in behavior database 606 or behavior database 612 in FIG. 6. The information in profile 406 is then used by software monitoring agent 604 to monitor the execution of program 602.

Turning next to FIG. 6, a diagram illustrating components used for monitoring and repairing programs is depicted in accordance with a preferred embodiment of the present invention. In the illustrative example, client 600 includes program 602 which is executing on client 600. Client 600 may be implemented using a data processing system, such as data processing system 300 in FIG. 3. Further, agent 604 also executes on client 600 to monitor program 602. Agent 604 is used to monitor the execution of program 602 and to detect errors or problems with the operation of program 602.

As illustrated, agent 604 may include a profiler or other performance code used to monitor the operation of program 602. Agent 604, in these examples, is executed in response to some event. This event may be a periodic event, such as the passage of some period of time. Further, the event may be the initialization of program 602 or the starting or restarting of client 600. Depending on the particular implementation, agent 600 may continuously run in the background monitoring program 602. Further, agent 604 may be initiated by a user or in response to an error in execution by program 602.

This monitoring by agent 604 is based on data stored in behavior database 606 or behavior database 612, which is used to compare the actual behavior of program 602 to an expected behavior as defined in behavior database 606 or behavior database 612. In the illustrative examples, behavior database 612 in server 610 is a database updated by a provider to reflect the most current fix or repair procedures. Behavior database 612 may be published for use by clients, such as client 600. Behavior database 606 in client 600 is a local copy of behavior database 612. This copy of the database may be used when the client has no connection or connectivity with server 610. When client 600 connects to server 610, behavior database 606 may be updated with information from behavior database 612. In most cases the copy of the database on server 610 contains the most up-to-date information, while the copy on client 600 may be outdated. Even though information may be dated on behavior database 606, this information may be sufficient to locally fix a problem. If the problem cannot be fixed locally, agent 604 attempts to contact server process 608 to see if more recent or up-to-date information is available. If updates are available, these updates are sent to client 600 to update behavior database 606.

These databases may include an array of values that are expected when selected operations occur by program 602. Further, particular variable values that are expected also may be included in behavior database 606. Other types of behavior include timing, such as the number of iterations in a loop or the amount of time spent in a loop. Behavior database 606 contains metadata information, such as metadata 502 in FIG. 5. Behavior database 606 is located on client 600. However, this behavior database may be located in a location external to client 600 such as in server 608, depending on the particular implementation.

If the observed behavior of program 602 does not match the expected behavior as defined in behavior database 606 or behavior database 612, an error may be generated. When an error occurs, agent 604 sends the error to the analysis engine 614. Analysis engine 614 may perform an analysis of the error to determine the cause of the error. Additionally, agent 604 may send the error to server 610 to be analyzed by analysis engine 616 using the server's behavior database 612. Server 610 may be implemented using a data processing system, such as data processing system 200 in FIG. 2.

In response to receiving the error and analysis information, server process 608 attempts to identify the problem and to provide a solution or fix for the error. This solution may be obtained from behavior database 606 or behavior database 612 in the illustrative examples. The fix or solution may be to modify a registry entry, program setting, or parameter. The solution might also entail installing a new dynamic link library or program on client computer 600. If the solution exists in the behavior database 606 or behavior database 612, the operation to be performed is sent to client computer 600 where it is acted upon by agent 602. Additionally, scripts also may be included in behavior database 612 to execute steps or procedures on a client to fix or repair errors.

In response to identifying a solution, server process 608 returns the solution to agent 604, which implements the solution. This solution may be, for example, the installation of an update or patch. Alternatively, agent 604 may execute a script received from server process 608 to change parameters in program 602 or other parameters within client 600, such as a registry setting or attribute setting to allow for successful operation of program 602.

Figure 7:
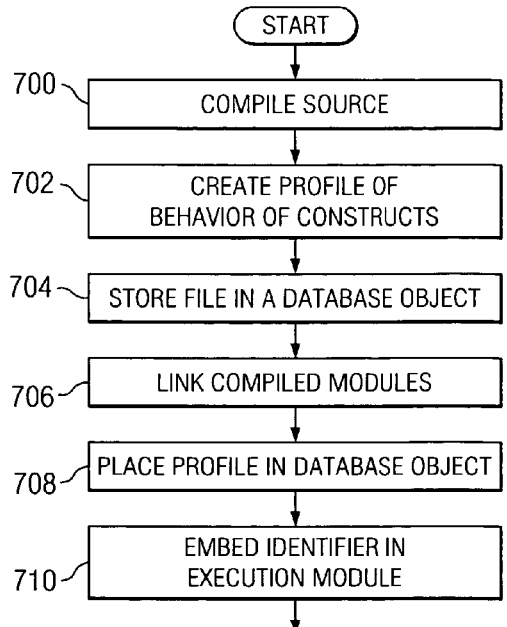
FIG. 7 is a flowchart of a process for generating profile information in accordance with a preferred embodiment of the present invention.

Turning next to FIG. 7, a flowchart of a process for generating profile information is depicted in accordance with a preferred embodiment of the present invention. The process illustrated in FIG. 7 may be implemented in a compiler, such as compiler 400 in FIG. 4.

The process begins by compiling the source code (step 700). Thereafter, a profile of behavior constructs is created as an extra step in the compiling of the source code (step 702). The profile of behavior is stored in a database object ( step 704). Thereafter, the compiled modules are linked to form the program (step 706) with the process terminating thereafter. The profile is placed in the program's database object with a unique identifier (step 708) and that same identifier is embedded in the execution module of the program (step 710).

Figure 8:
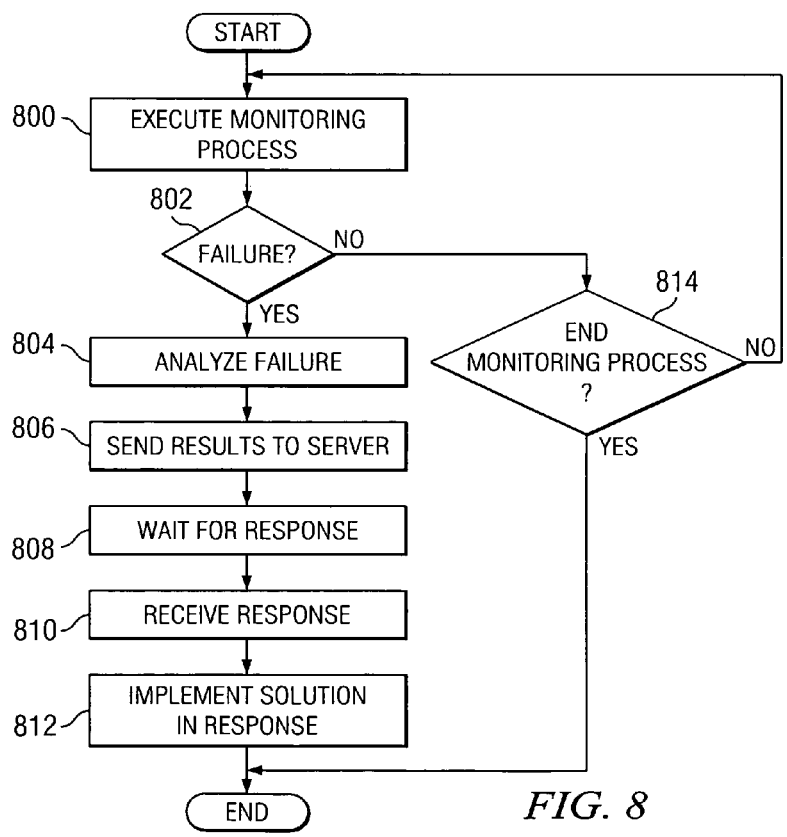
FIG. 8 is a flowchart of a process for monitoring a program in accordance with a preferred embodiment of the present invention.

With reference now to FIG. 8, a flowchart of a process for monitoring a program is depicted in accordance with a preferred embodiment of the present invention. The process illustrated in FIG. 8 may be implemented in an agent, such as agent 604 in FIG. 6.

The process begins by executing a monitoring process (step 800). The monitoring process executes the program under its supervision, much like a standard profiler program operates. The monitoring process reads ahead of the execution to identify recognizable constructs and their identifiers. Those identifiers are then used to find an index in behavior database 606 or 612 in FIG. 6 to the behavior metadata. The construct is then executed under the supervision of agent 604 in FIG. 6. Using the database metadata, agent 604 monitors the execution time of the construct, the outcome of the execution, and the values of certain key variables used in the construct to be sure they are correct. This function works like the ASSERT statement or macro works in today's compilers. A determination is made as to whether a failure occurs (step 802). If a failure or some error is detected, the failure is analyzed (step 804). The results of analysis are sent to the analysis engine 614 or 616 in FIG. 6 if a server is available (step 806), and the process waits for a response (step 808). A response is received (step 810). This response may be, for example, to install a new executable, a dynamic link library, to install a patch, or execute a script. The solution in the response is implemented by agent 604 (step 812) with the process terminating thereafter. The implementation of the solution involves, for example, installing a patch, replacing a faulty executable component, or executing a script.

With reference again to step 802, if a failure has not occurred, a determination is made as to whether the monitoring process should end (step 814). If the monitoring process is not to end, the process returns to step 800. Otherwise, the process terminates. In some cases, the monitoring process may run continuously or in other cases, only in response to some event.

Thus, the present invention provides an improved method, apparatus, and computer instructions for monitoring and managing errors or failures in programs. The mechanism of the present invention allows for an agent to automatically analyze errors in an application by comparing observed operations or behavior of the application to a database of expected behavior of operation. In response to identifying a failure or error, an analysis of the error or failure may be made with these results being returned to a server. The server uses the information to identify a solution. This solution is then returned to the agent for implementation.

Variations described for the present invention can be realized in any combination desirable for each particular application. Thus, particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method in a data processing system for managing a program, the method comprising:
    monitoring operation of the program, wherein monitoring the operation of the program comprises reading ahead of the execution to identify behavior constructs and their identifiers, wherein a profile of behavior constructs is created during compiling source code for the program, and wherein the profile of behavior constructs is stored in association with a unique identifier;
    comparing an observed operation of the program with an expected operation of the program to form a comparison, wherein the expected operation is identified during compiling of the program;
    determining whether an error has occurred based on the comparison;
    responsive to an occurrence of the error, obtaining a solution for the error; and
    implementing the solution when the solution is obtained.

2. The method of claim 1, wherein the obtaining step comprises:
    automatically executing a process to analyze the error to obtain an analysis;
    sending the analysis to a remote server with a request for the solution; and
    receiving the solution in response the request.

3. The method of claim 1, wherein the solution is at least one of a replacement executable file, a dynamic link library, a patch, and a script.

4. The method of claim 1, wherein the expected operation is stored in a database.

5. The method of claim 4, wherein the database is located on the data processing system.

6. The method of claim 1, wherein the monitoring step, the comparing step, the determining step, obtaining step, and the implementing step are implemented in an agent process.

7. The method of claim 1, wherein the monitoring step is initiated in response to an event.

8. The method of claim 7, wherein the event is a periodic event.

9. A data processing system for managing a program, the data processing system comprising:
a bus system;
a communications unit connected to the bus system;
a memory connected to the bus system, wherein the memory includes a set of instructions; and
a processing unit connected to the bus system, wherein the processing unit executes the set of instructions to monitor operation of the program, wherein monitoring the operation of the program comprises reading ahead of the execution to identify behavior constructs and their identifiers, wherein a profile of behavior constructs is created during compiling source code for the program, and wherein the profile of behavior constructs is stored in association with a unique identifier; compare an observed operation of the program with an expected operation of the program to form a comparison, wherein the expected operation is identified during compiling of the program; determine whether an error has occurred based on the comparison; obtain a solution for the error in response to an occurrence of the error; and implement the solution when the solution is obtained.

10. The data processing system of claim 9, wherein the set of instructions to obtain a solution further comprises:
instructions configured to automatically execute a process to analyze the error to obtain an analysis;
instructions configured to send the analysis to a remote server with a request for the solution; and
instructions configured to receive the solution in response the request.

11. The data processing system of claim 9, wherein the solution is at least one of a replacement executable file, a dynamic link library, a patch, and a script.

12. The data processing system of claim 9, wherein the expected operation is stored in a database.

13. The data processing system of claim 12, wherein the database is located on the data processing system.

14. The data processing system of claim 9, wherein the set of instructions to monitor, compare, determine, obtain, and implement are located in an agent process.

15. The data processing system of claim 9, wherein the set of instructions to monitor is initiated in response to an event.

16. The data processing system of claim 15, wherein the event is a periodic event.

17. A computer program product in a computer usable storage medium having computer readable program code for managing a program, the computer program product comprising:
instructions for monitoring operation of the program, wherein monitoring the operation of the program comprises reading ahead of the execution to identify behavior constructs and their identifiers, wherein a profile of behavior constructs is created during compiling source code for the program, and wherein the profile of behavior constructs is stored in association with a unique identifier;
instructions for comparing an observed operation of the program with an expected operation of the program to form a comparison, wherein the expected operation is identified during compiling of the program;
instructions for determining whether an error has occurred based on the comparison;
instructions, responsive to an occurrence of the error, for obtaining a solution for the error; and
instructions for implementing the solution when the solution is obtained.

18. The computer program product of claim 17, wherein the instructions for obtaining a solution further comprises:
instructions for automatically executing a process to analyze the error to obtain an analysis;
instructions for sending the analysis to a remote server with a request for the solution; and
instructions for receiving the solution in response the request.

19. The computer program product of claim 17, wherein the solution is at least one of a replacement executable file, a dynamic link library, a patch, and a script.

20. The computer program product of claim 17, wherein the expected operation is stored in a database.

21. The computer program product of claim 20, wherein the database is located on the data processing system.

22. The computer program product of claim 17, wherein the instructions are located in an agent process.

23. The computer program product of claim 17, wherein the instructions for monitoring operation of the program are initiated in response to an event.

24. The computer program product of claim 23, wherein the event is a periodic event.

* * * * *